United States Patent
Jang et al.

(10) Patent No.: US 10,255,823 B2
(45) Date of Patent: Apr. 9, 2019

(54) METHOD AND APPARATUS FOR GENERATING PERSONALIZED EXERCISE PROGRAM

(71) Applicant: Samsung Electronics Co., Ltd., Suwon-si (KR)

(72) Inventors: Dae-Geun Jang, Yongin-si (KR); Byunghoon Ko, Hwaseong-si (KR); SangKon Bae, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 15/251,620

(22) Filed: Aug. 30, 2016

(65) Prior Publication Data

US 2017/0291067 A1    Oct. 12, 2017

(30) Foreign Application Priority Data

Apr. 6, 2016  (KR) .................. 10-2016-0042322

(51) Int. Cl.
*G09B 19/00* (2006.01)
*A63B 24/00* (2006.01)

(52) U.S. Cl.
CPC ...... *G09B 19/0092* (2013.01); *A63B 24/0062* (2013.01); *A63B 24/0075* (2013.01); *G09B 19/0038* (2013.01)

(58) Field of Classification Search
CPC .......... A63B 24/0062; A63B 24/0075; A63B 24/0078; A63B 24/0081; A63B 2024/0065; A63B 2024/0068; A63B 2024/0071; G09B 19/0038; G09B 19/0092; G06F 19/3475; G06F 19/3481; A61B 5/1118; G16H 20/30
See application file for complete search history.

(56) References Cited

U.S. PATENT DOCUMENTS

| | | | |
|---|---|---|---|
| 6,917,897 B2 * | 7/2005 | Mork | G06F 19/00 702/177 |
| 8,655,717 B2 | 2/2014 | Schwarzberg et al. | |
| 8,727,948 B2 | 5/2014 | Herranen | |
| 8,882,668 B2 | 11/2014 | Thompson | |
| 2002/0138213 A1 * | 9/2002 | Mault | A61B 5/083 702/32 |
| 2005/0009193 A1 * | 1/2005 | Roberts | G01N 33/92 436/71 |
| 2005/0032608 A1 * | 2/2005 | Glusco | A63B 24/00 482/9 |

(Continued)

FOREIGN PATENT DOCUMENTS

| | | | |
|---|---|---|---|
| JP | 2006-255028 A | 9/2006 | |
| JP | 2008-86480 A | 4/2008 | |

(Continued)

*Primary Examiner* — Milap Shah
(74) *Attorney, Agent, or Firm* — NSIP Law

(57) ABSTRACT

A method to generate a personalized exercise program includes: receiving, at a processor, user information of a user generating, using the processor, personalized metabolic equivalent of task (MET) information based on the user information; calculating, using the processor, a target exercise amount based on a cumulative activity amount in a daily life of the user; and generating, using the processor, a personalized exercise program based on the personalized MET information and the target exercise amount.

19 Claims, 10 Drawing Sheets

(56) References Cited

U.S. PATENT DOCUMENTS

| | | | |
|---|---|---|---|
| 2007/0219059 A1 | 9/2007 | Schwartz et al. | |
| 2008/0009393 A1* | 1/2008 | Glusco | A61B 5/0205 |
| | | | 482/8 |
| 2008/0051919 A1* | 2/2008 | Sakai | A63B 71/00 |
| | | | 700/94 |
| 2008/0109158 A1* | 5/2008 | Huhtala | A63B 24/0062 |
| | | | 701/439 |
| 2009/0048044 A1* | 2/2009 | Oleson | A63B 24/0062 |
| | | | 473/570 |
| 2009/0062073 A1* | 3/2009 | Cheng | A63B 24/0062 |
| | | | 482/8 |
| 2009/0075781 A1 | 3/2009 | Schwarzberg et al. | |
| 2011/0281249 A1* | 11/2011 | Gammell | G16H 10/20 |
| | | | 434/247 |
| 2013/0236868 A1* | 9/2013 | Erkkila | A63B 24/0062 |
| | | | 434/247 |
| 2013/0282157 A1* | 10/2013 | Shin | A63B 24/0062 |
| | | | 700/91 |
| 2014/0164013 A1 | 6/2014 | Schwarzberg et al. | |
| 2014/0170609 A1 | 6/2014 | Hsiao et al. | |
| 2015/0107910 A1* | 4/2015 | Villard | G01G 19/4146 |
| | | | 177/25.12 |

FOREIGN PATENT DOCUMENTS

| | | |
|---|---|---|
| JP | 2009-240404 A | 10/2009 |
| JP | 2010-264088 A | 11/2010 |
| KR | 10-2012-0033898 A | 4/2012 |
| KR | 10-2013-0065755 A | 6/2013 |
| KR | 10-1301305 B1 | 9/2013 |
| KR | 10-1315907 B1 | 10/2013 |
| KR | 10-1398542 B1 | 5/2014 |
| KR | 10-2014-0113125 A | 9/2014 |
| KR | 10-1534811 B1 | 7/2015 |

* cited by examiner

METHOD AND APPARATUS FOR GENERATING PERSONALIZED EXERCISE PROGRAM

CROSS-REFERENCE TO RELATED APPLICATIONS

This application claims the benefit under 35 USC § 119(a) of Korean Patent Application No. 10-2016-0042322 filed on Apr. 6, 2016 in the Korean Intellectual Property Office, the entire disclosure of which is incorporated herein by reference for all purposes.

BACKGROUND

1. Field

The following description relates to a method and apparatus for generating a personalized exercise program.

2. Description of Related Art

Various methods of providing an exercise program to a user based on an exercise capacity and physical fitness evaluation result exist. To evaluate an exercise capacity and a physical fitness of the user, a physiological index such as a lactic acid threshold, a ventilatory threshold, and a maximal oxygen intake may need to be measured. An analysis may be performed on the physiological index through a complex process based on professional knowledge. In general, a user preference may not be applied to an exercise program provided based on the analysis of the physiological index. Also, the exercise capacity and physical fitness evaluation may be performed at a preset point in time, which may result in inconvenience to the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method to generate a personalized exercise program includes: receiving, at a processor, user information of a user generating, using the processor, personalized metabolic equivalent of task (MET) information based on the user information; calculating, using the processor, a target exercise amount based on a cumulative activity amount in a daily life of the user; and generating, using the processor, a personalized exercise program based on the personalized MET information and the target exercise amount.

The generating of the personalized MET information may include: retrieving basic MET information from a MET database (DB); and generating the personalized MET information by processing the basic MET information based on the user information.

The calculating of the target exercise amount may include: estimating the cumulative activity amount in the daily life of the user; and calculating the target exercise amount based on a total activity amount for the user and the cumulative activity amount, wherein the total activity amount is a goal amount of activity.

The total activity amount may be set based on a health care goal and a health care period of the user.

The generating of the personalized exercise program may include generating, based on the target exercise amount, the personalized exercise program using preset exercise program templates and the personalized MET information.

The generating of the personalized exercise program may include: adjusting one or both of an exercise intensity and an exercise duration of the exercise program templates to consume the target exercise amount based on the personalized MET information; and generating the personalized exercise program based on one or both of the adjusted exercise intensity and the adjusted exercise duration of the exercise program templates.

The method may further include: receiving, using the processor, preference information of the user, wherein the generating of the personalized exercise program further includes selecting a template matching the preference information from the exercise program templates, adjusting one or both of an exercise intensity and an exercise duration of the selected template for consuming the target exercise amount based on the personalized MET information, and generating the personalized exercise program based on one or both of the adjusted exercise intensity or the adjusted exercise duration of the selected template.

The method may further include: calculating, using the processor, a cumulative calorie intake of the user, wherein the calculating of the target exercise amount includes calculating the target exercise amount based on the cumulative calorie amount and the cumulative activity amount.

The user information may include any one or any combination of a gender, an age, a height, a weight, a waist size, a body mass index (BMI), a physical activity level, a body condition, a physical fitness level, a health care goal, and a health care period of the user.

The personalized exercise program may include exercise programs having any one or any combination of different types of exercises, different exercise durations, and different exercise intensities.

The method may further include: receiving, using the processor, preference information of the user, wherein the generating of the personalized exercise program includes selecting an exercise program from among the exercise programs based on one or both of the preference information and the user information, and providing, using the processor, the selected exercise program to the user.

A non-transitory computer-readable medium may store instructions that, when executed by the processor, cause the processor to perform the method.

In another general aspect, a method to generate a personalized exercise program includes: receiving, at a processor, user information of a user; retrieving, using the processor, basic metabolic equivalent of task (MET) information from a MET database (DB) based on the user information; calculating, using the processor, a target exercise amount based on a cumulative activity amount in a daily life of a user; and generating, using the processor, a personalized exercise program based on the basic MET information and the target exercise amount.

The generating of the personalized exercise program may include: determining, based on the basic MET information, exercise information including a type of exercise, an exercise intensity, and an exercise duration to consume the target exercise amount; and generating the personalized exercise program based on the exercise information.

The generating of the personalized exercise program may include generating the personalized exercise program using preset exercise program templates.

The method may further include: receiving, using the processor, preference information of the user, wherein the generating of the personalized exercise program includes selecting a template matching the preference information from the exercise program templates, adjusting one or both of an exercise intensity and an exercise duration of the selected template to consume the target exercise amount based on the personalized MET information; and generating the personalized exercise program based on one or both of the adjusted exercise intensity and the adjusted exercise duration of the selected template.

In another general aspect an apparatus to generate a personalized exercise program includes: a processor configured to receive user information of a user, generate personalized metabolic equivalent of task (MET) information based on the user information, and generate a personalized exercise program using the personalized MET information and a target exercise amount calculated based on a cumulative activity amount in a daily life of a user.

The processor may be further configured to: estimate the cumulative activity amount in the daily life of the user; and calculate the target exercise amount based on the cumulative activity amount and a total activity amount for the user, the total activity mount being a goal amount of activity.

The apparatus may further include: a memory configured to store a basic MET database (DB) including MET information, wherein the processor is further configured to retrieve the basic MET information from the MET DB and generate the personalized MET information by processing the basic MET information based on the user information.

The memory may include a template DB configured to store preset exercise program templates. The processor may be further configured to generate, based on the target exercise amount, the personalized exercise program using the preset exercise program templates and the personalized MET information.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
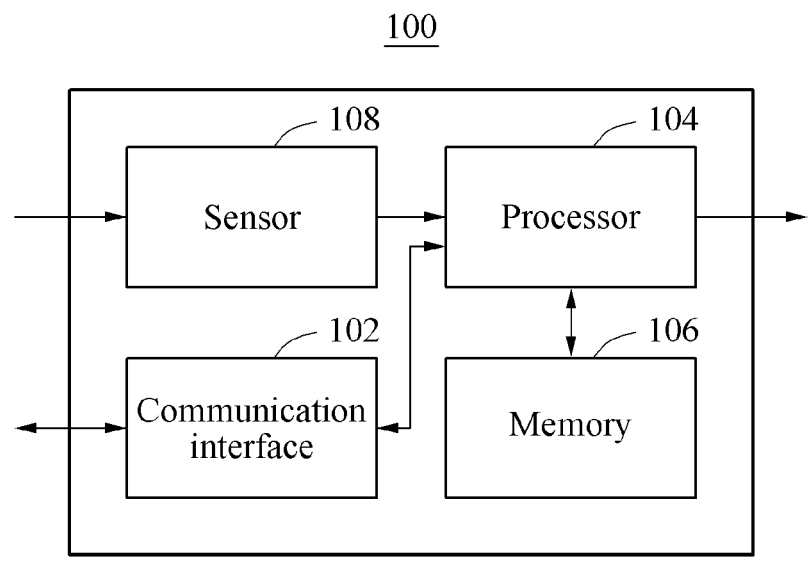
FIGS. 1A and 1B respectively illustrate an example of an apparatus for generating a personalized exercise program, and an example of apparatuses in which the apparatus for generating a personalized exercise program may be implemented.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

The following example embodiments may be applied to generate and provide a personalized exercise program. Example embodiments may be implemented in various forms, for example, a personal computer, a laptop computer, a tablet computer, a smartphone, a television, a smart appliance, an intelligent vehicle, or a wearable device. Example embodiments may be applied to generate and provide the personalized exercise program using personalized metabolic equivalent of task (MET) information and a target exercise amount by generating the personalized MET information based on user information received or input through, for example, a smartphone, a mobile device, or a smart home system. Hereinafter, reference will now be made in detail to examples with reference to the accompanying drawings, wherein like reference numerals refer to like elements throughout.

Figure 1B:
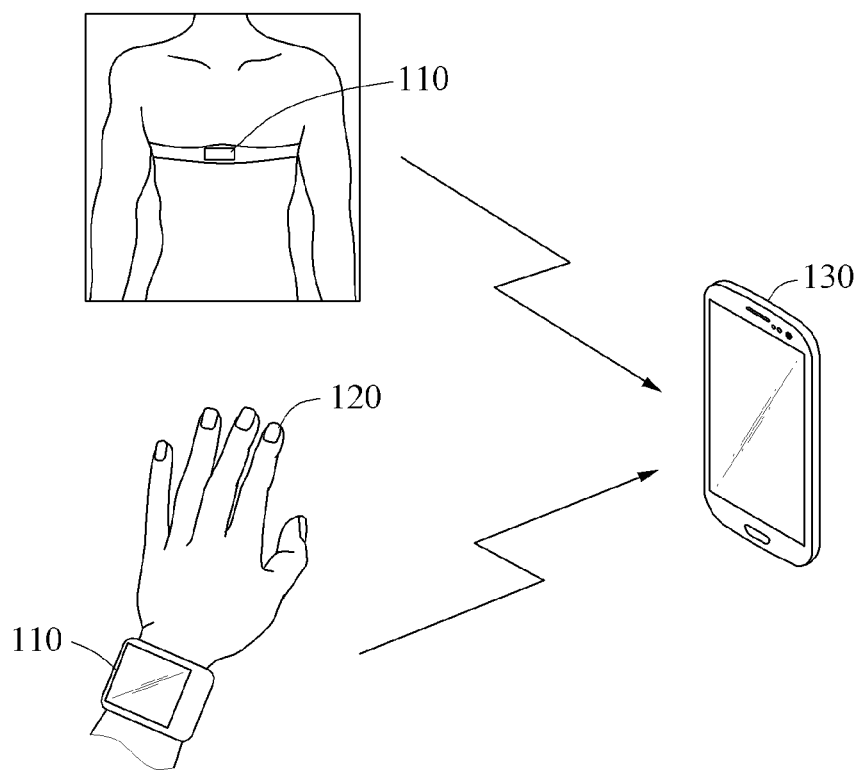

FIG. 1A is a block diagram illustrating an example of an apparatus 100 for generating a personalized exercise program. FIG. 1B illustrates an example of apparatuses in which the apparatus 100 may be embedded.

Referring to FIG. 1A, the apparatus 100 includes a communication interface 102, a processor 104, a memory 106, and a sensor 108. The communication interface 102, the processor 104, the memory 106, and the sensor 108 may communicate with one another through a bus (not shown).

The communication interface 102 receives user information. The user information includes, for example, any one or any combination of a gender, an age, a weight, a height, a waist size, a body mass index (BMI), a physical activity level, a body condition, a physical fitness level, a health care goal, and a health care period of a user. The communication interface 102 receives information from a device external to the apparatus 100, or provides a personalized exercise program generated by the processor 104 to the external device of the apparatus 100.

Also, the communication interface 102 receives preference information of the user. For example, the preference information includes information associated with any one or any combination of a type of exercise or exercise program, an exercise duration, and an exercise intensity preferred by the user.

In an example, the apparatus 100 includes an input device (not shown) including a graphical user interface (GUI) to receive various items of information from the user.

The processor 104 generates personalized MET information based on the user information received through the communication interface 102. The processor 104 calculates a target exercise amount based on a cumulative activity amount in a daily life of a user. The target exercise amount indicates, for example, an amount of exercises to be performed by a user for a predetermined period of time to achieve a health care goal such as a weight loss and a weight control. The period of time is, for example, a remaining time of a day, remaining days of a week, or remaining days of a month.

The processor 104 generates a personalized exercise program based on the target exercise amount and the personalized MET information.

The processor 104 estimates the cumulative activity amount in the daily life of the user. The processor 104 calculates the target exercise amount using the cumulative activity amount and a total activity amount. The processor 104 sets the total activity amount for the user based on, for example, a recommended daily energy expenditure, a recommended physical activity amount, and an intake of calories. The total activity amount is a goal activity amount, and is set for the predetermined period of time corresponding to the target exercise amount and the cumulative activity amount.

The memory 106 stores a MET database (DB) including basic MET information. The processor 104 retrieves the basic MET information from the MET DB stored in the memory 106. The processor 104 generates the personalized MET information by processing the basic MET information based on the user information.

The memory 106 further includes a template DB configured to store preset exercise program templates. The processor 104 generates the personalized exercise program using the preset exercise program templates stored in the memory 106 and the personalized MET information based on the target exercise amount. For example, the processor 104 generates the personalized exercise program by adjusting one or both of exercise intensities and exercise durations of the exercise program templates for consuming the target exercise amount based on the personalized MET information.

The memory 106 also stores, for example, the user information, preference information of the user, the total activity amount for the user, and the personalized MET information. The memory 106 includes, for example, a volatile memory and a non-volatile memory.

The sensor 108 senses a signal generated in the daily life of the user. For example, the signal generated in the daily life of the user includes a motion signal and a biosignal of the user. The sensor 108 includes a single sensor or a plurality of sensors to sense a signal or a plurality of signals generated in the daily life of the user.

The sensor 108 includes, for example, an electromyogram (EMG) sensor and an electrocardiogram (ECG) sensor configured to sense a biosignal of a user, a sensor configured to measure a photoplethysmography (PPG), a heartbeat sensor, a sensor configured to measure a change in blood flow rate based on an ultrasonic Doppler or laser Doppler scheme, and a body temperature sensor. Also, the sensor 108 includes, for example, an acceleration sensor configured to sense a motion of a user, an inertia sensor such as a gyro sensor, a strain sensor, a shock sensor, and a tilt sensor, and a global positioning system (GPS) sensor. The sensor 108 is not limited to including the aforementioned sensors and, thus, the sensor 108 may include various types and quantities of sensors. The biosignal includes, for example, heartbeat signals and EMG signals sensed consecutively. However, the biosignal may include other types and quantities of signals sensed consecutively or concurrently.

The processor 104 estimates or calculates an amount of activities in the daily life of the user based on a result sensed by the sensor 108 and stores the estimated amount of activities through an accumulation. The processor 104 calculates the target exercise amount base on the cumulative activity amount.

The processor 104 also performs at least one of the methods described with reference to FIGS. 2 through 10. The processor 104 executes a program including program code and controls the apparatus 100 based on the executed program code. A program code executed by the processor 104 is stored in the memory 106. The apparatus 100 may be connected to an external device, for example, a personal computer (PC) or a network, through an input and output device (not shown) to perform a data exchange.

At least one of the methods described with reference to FIGS. 1A through 10 is implemented to be in a form of an application executed in a processor of a device such as a tablet computer, a smartphone, or a wearable device, or implemented to be in a form of a chip embedded in the device.

FIG. 1B illustrates wearable devices 110 and 140, and a mobile device 130, to which the apparatus 100 is to be applied.

In an example, the apparatus 100 is embedded in the wearable device 110. The wearable device 110 is, for example, a wrist-worn such as a watch, a bracelet, or a band.

Also, the wearable device 110 may be a necklace, a chest-worn form, an ear-worn form, a head-worn form, or an ankle-worn form.

When a user 120 wears the wearable device 110 and performs an exercise, the apparatus 100 generates the personalized MET information based on the user information input through the wearable device 110. Also, the apparatus 100 uses sensors included in the wearable device 110 to sense the biosignal and the motion signal of the user. Based on a sensed result, the apparatus 100 estimates the amount of activities in the daily life of the user. The apparatus 100 calculates the target exercise amount based on the cumulative activity amount and generates the personalized exercise program based on the personalized MET information and the target exercise amount. The apparatus 100 provides the personalized exercise program to the user 120 through the wearable device 110.

The wearable device 110 including the apparatus 100 is interconnected with the mobile device 130 to share data with the mobile device 130. For example, a signal of the user 120 measured or sensed by the wearable device 110 is transferred to the mobile device 130.

In an example, the processor 104 of the apparatus 100 is included in the mobile device 130, and the sensor 108 is included in the wearable device 110. The wearable device 110 is configured to be worn on a body part, for example, a wrist or a chest of the user 120 to measure or sense either one or both of the biosignal and the motion signal of the user 120. The wearable device 110 amplifies and filters the measured signal. The wearable device 110 transmits the measured signal to the mobile device 130.

The processor 104 receives the user information through the mobile device 130. The processor 104 generates the personalized MET information based on the received user information. The processor 104 calculates the target exercise amount based on a signal, for example, the biosignal or the motion signal of the user 120 received from the wearable device 110. The processor 104 generates the personalized exercise program based on the personalized MET information and the target exercise amount. The processor 104 provides the generated exercise program to the user through one or both of the wearable device 110 and the mobile device 130. For example, the processor 104 provides the generated exercise program to the user through one or both of a display device and an audio device of one or both of the wearable device 110 and the mobile device 130. The generated exercise program may be provided as any one or any combination of images, video and audio.

The wearable device 110 is connected with the mobile device 130 through, for example, a wireless link. The wearable device 110 and the mobile device 130 may include one or more wireless Internet interfaces, such as any one or any combination of a wireless local area network (WLAN) interface, Wi-Fi interface, a digital living network alliance (DLNA interface), a wireless broadband (WiBro) interface, a world interoperability for microwave access (WiMAX) interface, and a high-speed downlink packet access (HS-DPA) interface, and/or one or more short-range communication interfaces, such as any one or any combination of a Bluetooth interface, a radio frequency identification (RFID) interface, an infrared data association (IrDA) interface, a ultra wideband (UWB) interface, a ZigBee interface, and/or a near field communication (NFC) interface.

The mobile device 130 is a tablet computer, a smart phone, or a personal digital assistant (PDA), for example. The mobile device 130 may also be network equipment such as a server. The mobile device 130 may be a single server computer or a system similar thereto, or at least one server bank or server cloud distributed at different geographical locations. The mobile device 130 receives various types of biosignals through the wearable device 110 or any other measuring device.

Figure 2:
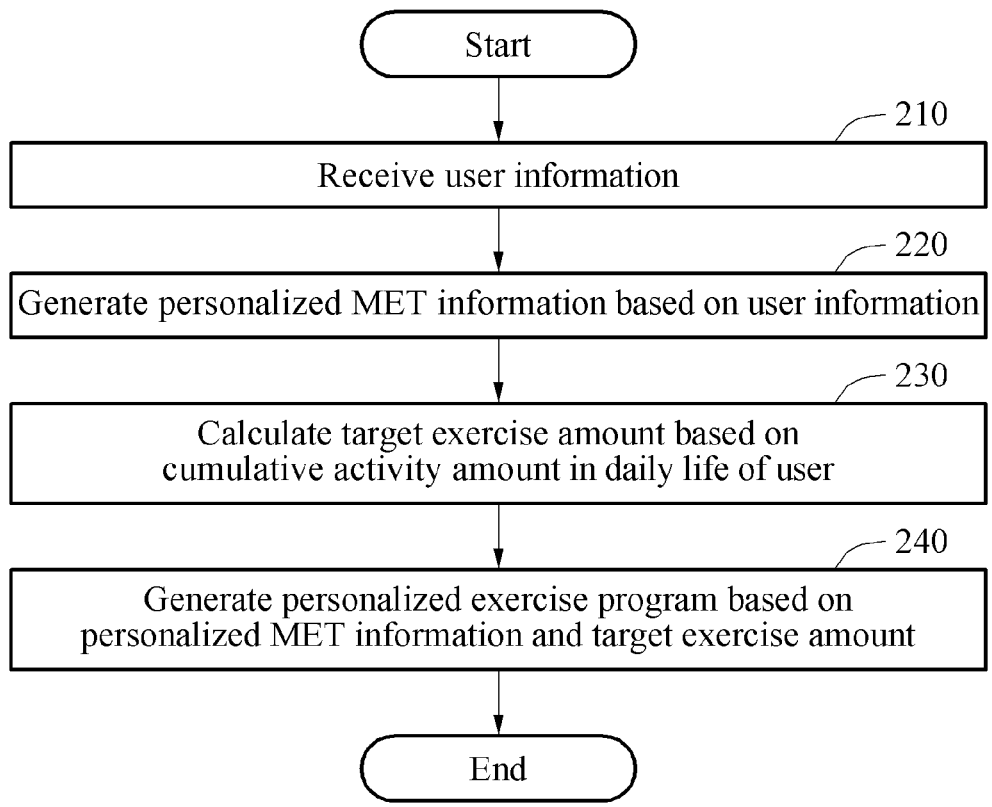
FIG. 2 illustrates an example of a method of generating a personalized exercise program.

FIG. 2 is a flowchart illustrating an example of a method of generating a personalized exercise program. Referring to FIG. 2, in operation 210, an apparatus for generating a personalized exercise program, such as the apparatus 100 of FIG. 1A, receives user information. Hereinafter, the apparatus for generating a personalized exercise program is also referred to as a generation apparatus. In this example, the user information is input through an input device of the generation apparatus. Also, the user information may be information input through a GUI or a virtual keyboard displayed on a screen of a wearable device or a mobile device so as to be received in the generation apparatus through the communication interface 102. The user information includes, for example, any one or any combination of a gender, an age, a height, a weight, a waist size, a BMI, a physical activity level, a body condition, a physical fitness level, a health care goal, and a health care period of a user.

In operation 220, the generation apparatus generates personalized MET information based on the user information. For example, the generation apparatus generates the personalized MET information in a form of table. An example of a method of generating the personalized MET information in the generation apparatus will be also described with reference to FIG. 3.

In operation 230, the generation apparatus calculates a target exercise amount based on a cumulative activity amount in a daily life of the user. The generation apparatus uses, for example, any one or any combination of an acceleration sensor, a GPS sensor, a stride sensor, and a heartbeat sensor to estimate an activity amount consumed by the user in the daily life. The generation apparatus calculates the target exercise amount based on the estimated amount of activities. An example of a method of calculating the target exercise amount in the generation apparatus will be also described with reference to FIG. 4.

In operation 240, the generation apparatus generates a personalized exercise program based on the personalized MET information generated in operation 220 and the target exercise amount calculated in operation 230. For example, based on the target exercise amount, the generation apparatus generates the personalized exercise program using preset exercise program templates and the personalized MET information. In this example, the exercise program templates are stored in a template DB included in a memory. A method of generating the personalized exercise program in the generation apparatus will be also described as an example with reference to FIG. 5.

Figure 3:
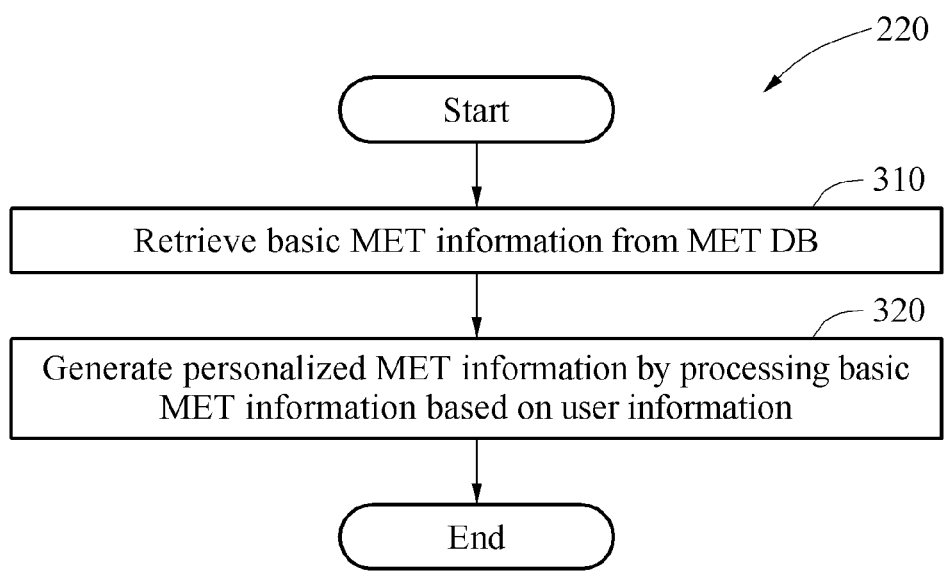
FIG. 3 illustrates an example of a method of generating personalized metabolic equivalent of task (MET) information.

FIG. 3 is a flowchart illustrating an example of a method of generating personalized MET information. Referring to FIG. 3, in operation 310, a generation apparatus retrieves basic MET information from a MET DB.

The basic MET information indicates a ratio between an amount of energy used during an activity of a user and an amount of energy used in a stable state of the user. Thus, the basic MET information is used as an index of energy consumption. 1 MET is an amount of energy used during a recess of the user in a sitting posture, and the same as an oxygen intake of about 3.5 milliliters per kilogram per minute (ml/kg/min). The basic MET information is also referred to as a MET absolute value. The basic MET information is provided in a form as shown in Table 1.

TABLE 1

| Physical activity | MET absolute value |
|---|---|
| 4.8 km/h Walking | 3.0 |
| 6.4 km/h Walking | 5.0 |
| 8.0 km/h Running | 8.0 |
| 16 km/h Cycling | 6.0 |
| Basketball, Tennis | 8.0 |
| Soccer | 7.0 |

The MET DB is stored in the memory 106 of the generation apparatus or in a source external to the generation apparatus.

In operation 320, the generation apparatus generates personalized MET information by processing the basic MET information, for example, original MET information based on the user information. For example, the generation apparatus generates the personalized MET information according to Equation 1.

$$\text{Personalized } METs = \text{Original(Absolute)} METs \times \frac{3.5 \text{ ml/kg/min}}{\text{Resting Metabolic Rate(ml/kg/min)}}$$ [Equation 1]

The generation apparatus obtains a resting metabolic rate (RMR) in a unit of kilocalorie per day (kcal/day) using one of methods represented in Table 2. The RMR is substitutable with a basal metabolic rate (BMR).

TABLE 2

| Method | | Equation |
|---|---|---|
| 1. Body surface area (BSA) | Male | RMR = BSA × 38 kcal/hr × 24 hr |
| | Female | RMR = BSA × 35 kcal/hr × 24 hr |
| 2. Harris-Benedict equation | Male | RMR = 66.47 + 13.75 × Weight + 5.003 × Height − 6.755 × Age |
| | Female | RMR = 655.1 + 9.563 × Weight + 1.850 × Height − 4.676 × Age |
| 3. Roza-Shizgal equation | Male | RMR = 88.362 + 13.397 × Weight + 4.799 × Height − 5.677 × Age |
| | Female | RMR = 477.593 + 9.247 × Weight + 3.098 × Height − 4.330 × Age |
| 4. Mifflin et al. equation | Male | RMR = (9.99 × Weight + 6.25 × Height − 4.92 × Age) + 5.0 |
| | Female | RMR = (9.99 × Weight + 6.25 × Height − 4.92 × Age) − 161 |
| 5. Fat-free mass (FFM) | M/F | RMR = 500 + 22 (FFM kg) |
| 6. Weight base | Male | RMR = Weight (kg) × 24.2 kcal/kg |
| | Female | RMR = Weight (kg) × 22.0 kcal/kg |

For example, the user is a 20-year-old male who is 175 centimeters (cm) in height and 75 kilograms (kg) in weight. In this example, the RMR is calculated according to Roza-Shizgal equation in Table 2.

As shown in Table 2, RMR is obtained as 1819.422 kcal/day (=88.362+13.397×75+4.799×175−5.677× 20=88.362+13.397×75+4.799×175−5.677×20=88.362+ 1004.775+839.825−113.54) using "88.362+13.397× weight+4.799×height−5.677×age". The calculated RMR may be understood as indicating the user in a resting state consumes 1819.422 kilocalories (kcal) for one day.

Similarly, the generation apparatus obtains RMRs of a 50-year-old male who in 175 cm in height and 75 kg in weight, and a 20-year-old female and a 50-year-old female who are 160 cm in height and 60 kg in weight as shown in Table 3 below.

TABLE 3

| | | | | BMR (Using Roza-shizgal equation) | |
|---|---|---|---|---|---|
| | Weight | Height | Age | kcal/day | ml/kg/min |
| Male | 75.0 | 175.0 | 20 | 1819.42 | 3.54 |
| | 75.0 | 175.0 | 50 | 1649.11 | 3.21 |
| Female | 60.0 | 160.0 | 20 | 1441.49 | 3.50 |
| | 60.0 | 160.0 | 50 | 1311.59 | 3.19 |

As shown in Table 4, the generation apparatus generates the personalized MET information by processing the basic MET information according to Equation 1 based on the user information including, for example, a weight, a height, an age, and a gender.

TABLE 4

| | MET | Male (175 cm, 75 kg) | | Female (160 cm, 60 kg) | |
|---|---|---|---|---|---|
| Physical activity | absolute value | Age 20 | Age 50 | Age 20 | Age 50 |
| 4.8 km/h Walking | 3.0 | 2.97 | 3.27 | 3.00 | 3.29 |
| 6.4 km/h Walking | 5.0 | 4.95 | 5.46 | 4.99 | 5.49 |
| 8.0 km/h Running | 8.0 | 7.91 | 8.73 | 7.99 | 8.78 |
| 16 km/h Cycling | 6.0 | 5.94 | 6.55 | 5.99 | 6.59 |
| Basketball, Tennis singles | 8.0 | 7.91 | 8.73 | 7.99 | 8.78 |
| Soccer | 7.0 | 6.93 | 7.64 | 6.99 | 7.69 |

Figure 4:
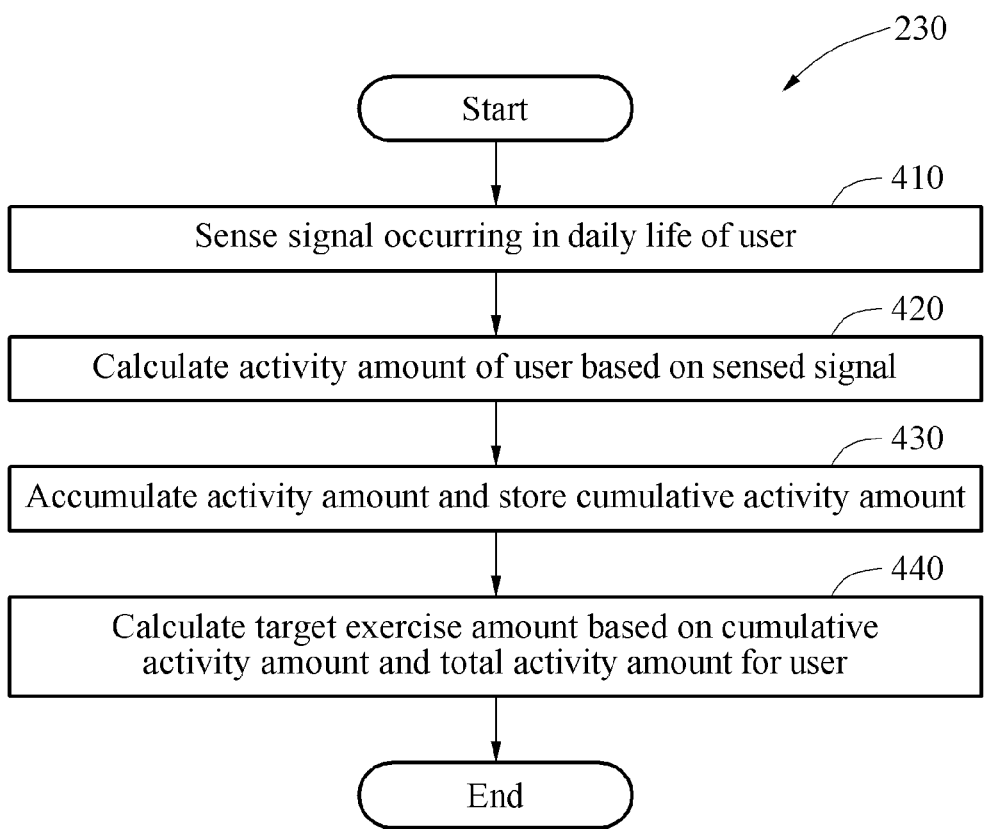
FIG. 4 illustrates an example of a method of calculating a target exercise amount.

FIG. 4 is a flowchart illustrating an example of a method of calculating a target exercise amount. Referring to FIG. 4, in operation 410, a generation apparatus senses a signal occurring in a daily life of a user. The generation apparatus senses or measures biosignals and motion signals naturally occurring while the user, for example, wakes up, goes to work, works at an office, has a meal, and leaves the office in a daily life. The generation apparatus senses the motion signals and the biosignals of the user using various sensors.

In operation 420, the generation apparatus estimates, or calculates, an activity amount of the user based on the signal sensed in operation 410. The generation apparatus estimates the activity amount in the daily life of the user based on, for example, a speed-based parameter, heart rate information, stride data, and MET information. An example of a method of estimating the activity amount of the user in the generation apparatus based on the aforementioned information will be described in detail below.

The generation apparatus measures the speed-based parameter using, for example, an acceleration sensor, a GPS sensor, and a pedaling sensor. The speed based parameter includes, for example, revolutions per minutes (RPM), a gradient, and a moving speed of a user. The generation apparatus calculates oxygen consumption of the user based on the speed based parameter and user information including, for example, a gender, an age, a height, and a weight.

As shown in Table 5, the generation apparatus calculates an oxygen consumption $VO_2$ of an activity in the daily life of the user according to an American College of Sports Medicine (ACSM) metabolic equation, for example.

TABLE 5

| Exercise type | Oxygen consumption (VO$_2$) calculation |
|---|---|
| Walking | VO$_2$ (ml/kg/min) = 0.1 × S(m/min) + 1.8 × S × G + 3.5 (ml/kg/min) |
| Running | VO$_2$ (ml/kg/min) = 0.2 × S(m/min) + 0.9 × S × G + 3.5 (ml/kg/min) |
| Cycling | VO$_2$ (ml/kg/min) = 1.8 (ml/kg/min) × WR (kg · m/min)/BW (kg) + 7 (ml/kg/min) |

In Table 5, S denotes speed in a unit of meters per minute (m/min), and G denotes a percent grade expressed as a fraction. Also, WR denotes a work rate in a unit of kilogram-force meters per minute (kg·m/min), and BW denotes a body weight in a unit of kg.

TABLE 6

| Low (<3 METs) | Intermediate (3~<6 METs) | High (≥6 METs) |
|---|---|---|
| *Walking/Jogging/Running* | | |
| Slow walking in house, store, or office = 2.0 | Walking 3.0 mi/h = 3.0$^a$<br>Walking at active speed (4 mi/h) = 5.0$^a$ | 5 mi/h Jogging = 8.0$^a$<br>6 mi/h Jogging = 10.0$^a$<br>7 mi/h Running = 11.5$^a$ |
| *Housekeeping and working* | | |
| Sitting (using computer, working on desk, light working with hand tools) = 1.5<br>Standing and doing chores (bedding, dishwashing, ironing, meal preparing, working as clerk) = 2.0~2.5 | Cleaning, window wiping, car washing, garage arranging = 3.0<br>Floor or carpet cleaning, vacuuming, mopping = 3.0~3.5<br>Mowing = 5.5 | Shoveling sand, coal, etc. = 7.0<br>Carrying heavy load (bricks) = 7.5<br>Hard working in farm such as building haystack = 8.0<br>Digging ditch with shovel = 8.5 |
| *Leisure and sports* | | |
| Drawing, crafting, card playing = 1.5<br>Billiards = 2.5<br>Boarding = 2.5<br>Darts = 2.5<br>Fishing (sitting) = 2.5<br>Playing instruments = 2.0~2.5 | Badminton (for pleasure), basketball (shooting) = 4.5<br>Slow (quick) dance = 3.0 (4.5)<br>Golf (hittingball and walking) = 4.3<br>Boating and windsurfing = 3.0<br>Tennis doubles = 5.0<br>Volleyball (non-match) = 3.0~4.0 | Low-intensive cycling on level ground (10~12 mi/h), Slow swimming = 6.0<br>Basketball, tennis singles, volleyball on match = 8.0<br>Intermediate-intensive cycling on level ground (12~14 mi/h) = 8. Fast cycling (14~16 mi/h) = 10<br>Soccer for fun = 7.0, on match = 10.0 |

The generation apparatus converts the calculated oxygen consumption into the activity amount in the daily life of the user. The generation apparatus converts the oxygen consumption into the activity amount using, for example, an equation "1 MET=1 kilocalorie per kilogram per hour (kcal/kg/hr)=3.5 ml/kg/min". The generation apparatus accumulates activity amounts occurring in different activities and estimates a current cumulative activity amount for a predetermined period of time.

Also, the generation apparatus estimates the activity amount based on the stride data including, for example, a count of strides, a stride length, and a physical activity time.

The generation apparatus calculates an exercise speed based on the stride data. In this example, the stride length is defined as a predetermined value proportional to a height of a user. The generation apparatus estimates the oxygen consumption by applying the calculated exercise speed to the ACSM metabolic equation or a derived equation. The generation apparatus calculates the activity amount in the daily life of the user based on the estimated oxygen consumption.

The generation apparatus estimates the activity amount of the user based on the heart rate information and the user information. The heart rate information includes, for example, a heart rate (HR), a maximal heart rate (HRmax), a heart rate reserve (HRR), and a heart rate net (HRN). The heart rate reserve is obtained by subtracting a resting heart rate (HRrest) from the maximal heart rate, for example, HRmax−HRrest. Also, the heart rate net is obtained by subtracting the resting heart rate from an activated heart rate (HRactivity), for example, HRactivity−HRrest. The maximal heart rate indicates a heart rate measured when the user performs a full intensity of exercise. In general, the maximal heart rate corresponds to an approximate value obtained by subtracting an age of the user from the numeric value "220".

The activated heart rate indicates a heart rate measured when the user performs a physical activity corresponding to a predetermined exercise intensity. The resting heart rate indicates a heart rate measured in a stable state in which the user does not perform an exercise.

The generation apparatus also calculates the activity amount of the user based on the basic MET information. For example, basic MET information is quantified based on various physical activities of the user as shown in Table 6.

The generation apparatus calculates the activity amount by multiplying a basic MET value of at least one physical activity by a weight of the user and duration of the physical activity performed by the user. A relationship between the basic MET and an energy expenditure based on a unit of kcal is expressed as, for example, 1 kcal=1 MET×weight (kg)× time (hours).

In operation 430, the generation apparatus accumulates the activity amount calculated in operation 420 to determine a cumulative activity amount, and stores a cumulative activity amount. In determining the cumulative activity amount, the activity amount is accumulated for a predetermined period of time, for example, a day, a week, and a month.

In operation 440, the generation apparatus calculates a target exercise amount based on the cumulative activity amount and a total activity amount for the user. The generation apparatus calculates the target exercise amount based on a difference between the cumulative activity amount and the total activity amount. In this example, the total activity amount is a goal amount of activity set based on, for example, a recommended daily energy expenditure, a recommended physical activity amount, or a calorie intake of the user. The total activity amount is set for the predetermined period of time corresponding to the cumulative activity amount and the target exercise amount. Also, the total activity amount is differently set for the user based on a health care goal and a health care period. The health care goal and the health care period are included in the user information or input by the user. The health care goal includes, for example, a weight loss, a weight maintenance, and a weight gain. A method of setting the total activity amount for the user in the generation apparatus will be described with reference to FIG. 6.

Figure 5:
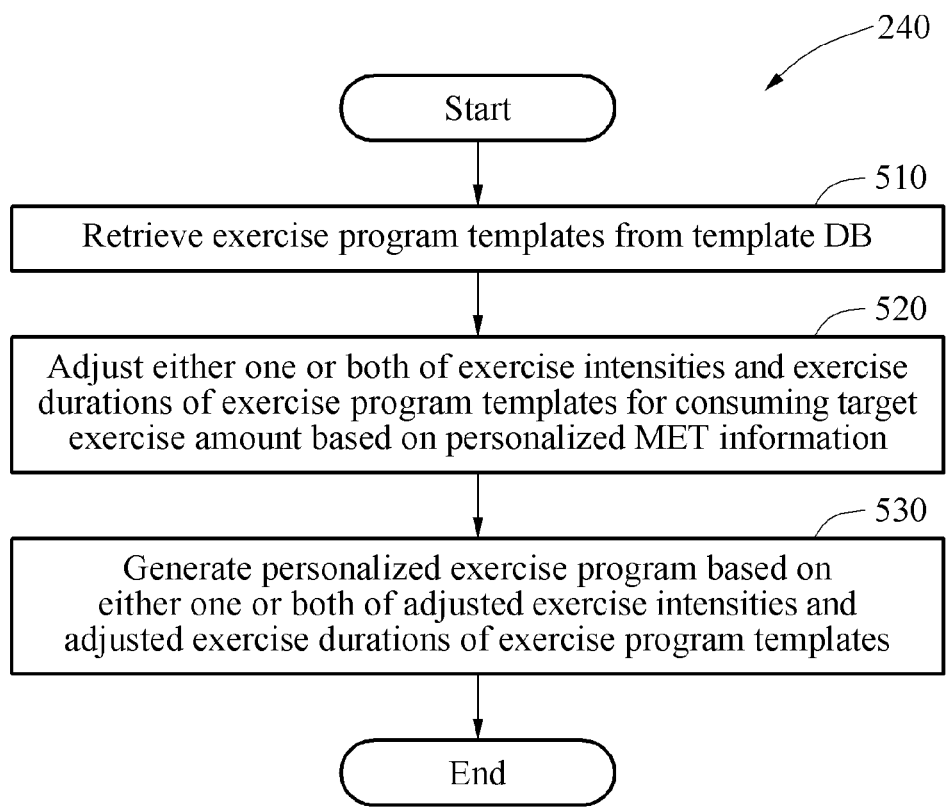
FIG. 5 illustrates an example of a method of generating a personalized exercise program.

FIG. 5 is a flowchart illustrating another example of a method of generating a personalized exercise program. Referring to FIG. 5, in operation 510, a generation apparatus retrieves pre-configured exercise program templates from a template DB. The template DB stores exercise program templates including personalized MET information relative to basic MET information.

In operation 520, the generation apparatus adjusts one or both of exercise intensities and exercise durations of exercise program templates for consuming a target exercise amount based on the personalized MET information.

The generation apparatus obtains a reference energy expenditure for each of the exercise program templates by calculating a physical activity amount for each of the exercise program templates. In this example, the generation apparatus obtains the reference energy expenditure according to an equation based on the basic MET information and the energy expenditure in a unit of kcal. The generation apparatus compares the reference energy expenditure for each of the exercise program templates and the target exercise amount and adjusts one or both of the exercise intensities and the exercise durations of the exercise program templates. In an example, the generation apparatus adjusts the exercise durations without a change in the exercise intensities, adjusts the exercise intensities without a change in the exercise durations, or adjusts both the exercise durations and the exercise intensities.

In operation 530, the generation apparatus generates the personalized exercise program based on either one or both of the exercise intensities and the exercise durations adjusted in the exercise program templates.

In accordance with the example method described above with respect to FIG. 5, the generation apparatus generates the personalized exercise program for each user based on the target exercise amount and the personalized MET using the pre-configured exercise program templates.

Figure 6:
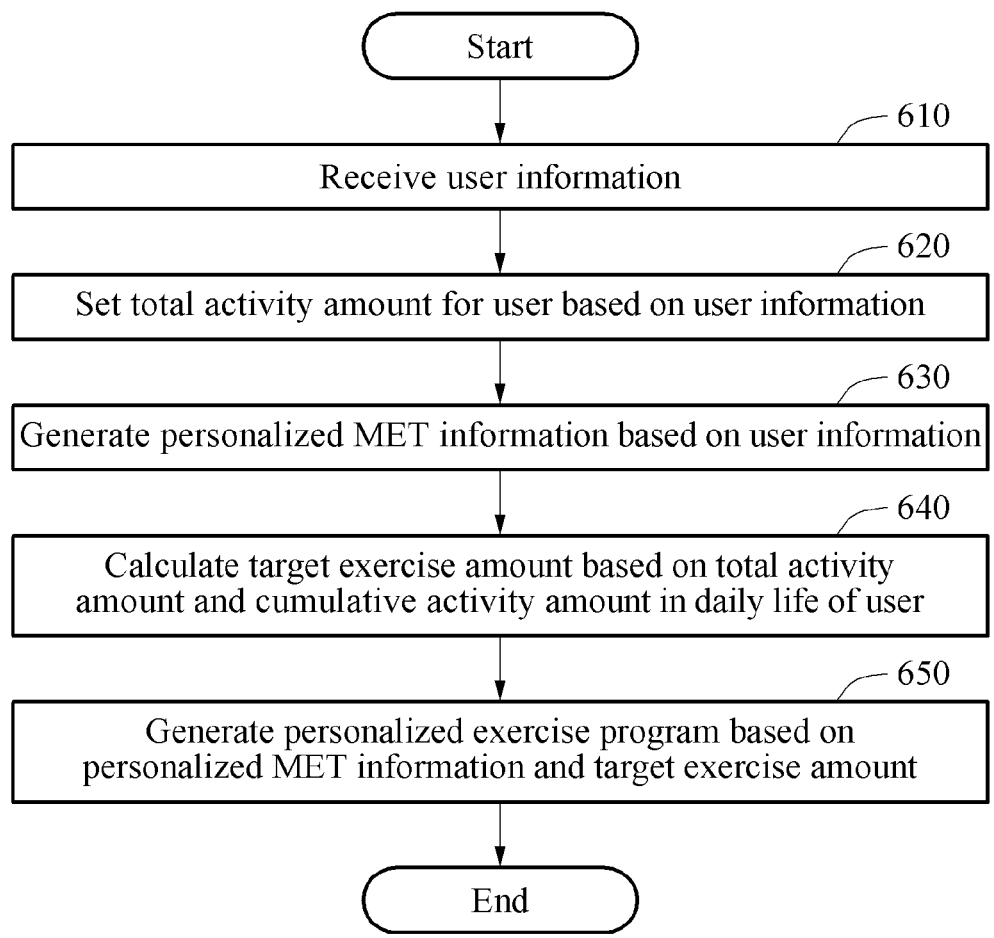
FIGS. 6 through 10 illustrate examples of a method of generating a personalized exercise program.

FIG. 6 is a flowchart illustrating another example of a method of generating a personalized exercise program. Referring to FIG. 6, in operation 610, a generation apparatus receives user information. In operation 620, the generation apparatus sets a total activity amount for a user based on the user information. For example, the generation apparatus sets the total activity amount for the user based on, for example, a recommended daily energy expenditure, a recommended physical activity amount, and an intake of calories. The total activity amount is also referred to as, for example, a total energy expenditure (TEE). Example methods of setting the total activity amount for the user in the generation apparatus are described below.

A Method of Setting the Total Activity Amount for the User Based on the Recommended Daily Energy Expenditure In an example, a method of setting the total activity amount for the user based on a nutritionally recommended daily energy expenditure includes, for example, a method of calculating a total activity amount of Institute of Medicine (IOM), a method of calculating a total activity amount based on an RMR, and a method of calculating an additional calorie demand based on a physical activity level.

For example, the generation apparatus calculates the total activity amount or the total energy expenditure for the user according to a total energy expenditure equation of the IOM based on a physical activity (PA) coefficient, as shown in Table 7.

TABLE 7

| Gender and age | Total energy expenditure (TEE) calculation | Coefficient of physical activity (PA) |
|---|---|---|
| Male at age 3-18 | TEE = 88.5 − (61.9 × Age) + PA[(26.7 × Weight) + (903 × Height)] | 1.00, Inactive<br>1.13, Slightly active<br>1.26, Active<br>1.42, Very active |
| Male ≥ age 19 | TEE = 662 − (9.53 × Age) + PA[(15.9 × Weight) + (540 × Height)] | 1.00, Inactive<br>1.11, Slightly active<br>1.25, Active<br>1.48, Very active |
| Female at age 3-18 | TEE = 135.3 − (30.8 × Age) + PA[(10.0 × Weight) + (934 × Height)] | 1.00, Inactive<br>1.16, Slightly active<br>1.31, Active<br>1.56, Very active |
| Female ≥ age 19 | TEE = 354 − (6.91 × Age) + PA[(9.36 × Weight) + (726 × Height)] | 1.00, Inactive<br>1.12, Slightly active<br>1.27, Active<br>1.45, Very active |

As shown in Table 8, the generation apparatus calculates the total activity amount for the user using the total energy expenditure based on the RMR or a BMR. Table 8 shows an example of a method of calculating the RMR or the BMR based on a unit of kcal/day.

TABLE 8

| Method | | Equation |
|---|---|---|
| 1. Body surface area (BSA) | Male | RMR = BSA × 38 kcal/hr × 24 hr |
| | Female | RMR = BSA × 35 kcal/hr × 24 hr |
| 2. Harris-Benedict Equation | Male | RMR = 66.47 + 13.75 × Weight + 5.003 × Height − 6.755 × Age |
| | Female | RMR = 655.1 + 9.563 × Weight + 1.850 × Height − 4.676 × Age |
| 3. Roza-Shizgal Equation | Male | RMR = 88.362 + 13.397 × Weight + 4.799 × Height − 5.677 × Age |
| | Female | RMR = 477.593 + 9.247 × Weight + 3.098 × Height − 4.330 × Age |
| 4. Mifflin et al. Equation | Male | RMR = (9.99 × Weight + 6.25 × Height − 4.92 × Age) + 5.0 |
| | Female | RMR = (9.99 × Weight + 6.25 × Height − 4.92 × Age) − 161 |
| 5. Fat-free mass (FFM) | M/F | RMR = 500 + 22 (FFM kg) |
| 6. Weight base | Male | RMR = Weight (kg) × 24.2 kcal/kg |
| | Female | RMR = Weight (kg) × 22.0 kcal/kg |

The generation apparatus calculates the total activity amount for the user using the method of calculating the additional calorie demand based on the physical activity level. Table 9 shows an example of the method of calculating the additional calorie demand based on the physical activity level.

TABLE 9

| | Increment relative to RMR (%) | |
|---|---|---|
| Activity level | Male | Female |
| Inactivity | 15 | 15 |
| Low activity (common jobs, office worker, housekeeper) | 40 | 35 |
| Normal activity (industry worker, farmer, fisherman) | 50 | 45 |

TABLE 9-continued

| Activity level | Increment relative to RMR (%) | |
|---|---|---|
| | Male | Female |
| High activity (athlete, dancer, unskilled worker, minor) | 85 | 70 |
| Very high activity (carpenter, blacksmith, construction worker) | 110 | 100 |

The generation apparatus obtains $(1+\alpha)\times$RMR as the total activity amount for the user in consideration of $\alpha$, $\alpha$ being an increment relative to the RMR and greater than "0". Also, the generation apparatus sets the total activity amount for the user based on a health care goal.

For example, when the health care goal is a weight maintenance, the generation apparatus sets the total activity amount for the user to be equal to 1.0×TEE. When the health care goal is a weight loss, the generation apparatus sets the total activity amount to be $(1.0+\beta)\times$TEE, $\beta$ being an increment relative to the RMR and greater than "0". When the health care goal is a weight gain, the generation apparatus sets the total activity amount to be $(1.0-\beta)\times$TEE, $\beta$ being greater than "0" and less than "1".

As described above, the generation apparatus obtains the total activity amount of the user by calculating the recommended energy expenditure based on the user information.

A Method of Setting the Total Activity Amount for the User Based on the Recommended Physical Activity Amount In another example, the generation apparatus sets the total activity amount for the user based on exercise prescription guidelines of ACSM. For example, the generation apparatus estimates a cardiorespiratory fitness level of the user based on a standard maximal aerobic exercise capacity classification by gender and age as shown in Table 10.

TABLE 10

Maximal aerobic exercise capacity standard by gender and age (based on VO$_2$max (ml/kg/min))

| Grade | % | Age 20-29 | | Age 30-39 | | Age 40-49 | | Age 50-59 | | Age 60-69 | | Age 70-79 | |
|---|---|---|---|---|---|---|---|---|---|---|---|---|---|
| | | Male | Female | Male | Female | Male | Female | Male | Female | Male | Female | Male | Female |
| S | 99 | 61.2 | 55.0 | 58.3 | 52.5 | 57.0 | 51.1 | 54.3 | 45.3 | 51.1 | 42.4 | 49.7 | 42.4 |
| | 95 | 56.2 | 50.2 | 54.3 | 46.9 | 52.9 | 45.2 | 49.7 | 39.9 | 46.1 | 36.9 | 42.4 | 36.7 |
| E | 90 | 54.0 | 47.5 | 52.5 | 44.7 | 51.1 | 42.4 | 46.8 | 38.1 | 43.2 | 34.6 | 39.5 | 33.5 |
| | 85 | 52.5 | 45.3 | 50.7 | 42.5 | 48.5 | 40.0 | 44.6 | 36.7 | 41.0 | 33.0 | 38.1 | 32.0 |
| | 80 | 51.1 | 44.0 | 47.5 | 41.0 | 46.8 | 38.9 | 43.3 | 35.2 | 39.5 | 32.3 | 36.0 | 30.2 |
| G | 75 | 49.2 | 43.4 | 47.5 | 40.3 | 45.4 | 38.1 | 41.8 | 34.1 | 38.1 | 31.0 | 34.4 | 29.4 |
| | 70 | 48.2 | 41.1 | 46.8 | 38.8 | 44.2 | 36.7 | 41.0 | 32.9 | 36.7 | 30.2 | 33.0 | 28.4 |
| | 65 | 46.8 | 40.6 | 45.3 | 38.1 | 43.9 | 35.6 | 39.5 | 32.3 | 35.9 | 29.4 | 32.3 | 27.6 |
| | 60 | 45.7 | 39.5 | 44.4 | 36.7 | 42.4 | 35.1 | 38.3 | 31.4 | 35.0 | 29.1 | 30.9 | 26.6 |
| F | 55 | 45.3 | 38.1 | 43.9 | 36.7 | 41.0 | 33.8 | 38.1 | 30.9 | 33.9 | 28.3 | 30.2 | 26.0 |
| | 50 | 43.9 | 37.4 | 42.4 | 35.2 | 40.4 | 33.3 | 36.7 | 30.2 | 33.1 | 27.5 | 29.4 | 25.1 |
| | 45 | 43.1 | 36.7 | 41.4 | 34.5 | 39.5 | 32.3 | 36.6 | 29.4 | 32.3 | 26.9 | 28.5 | 24.6 |
| | 40 | 42.2 | 35.5 | 41.0 | 33.8 | 38.4 | 31.6 | 35.2 | 28.7 | 31.4 | 26.6 | 28.0 | 23.8 |

For example, the user is a 25-year-old male who is 70 kg in weight. In this example, the generation apparatus estimates the cardiorespiratory fitness level of the user based on VO$_2$max values corresponding to 50% of distribution for each group of gender/age.

When the user performs an intermediate intensive exercise for 30 minutes every day, the generation apparatus obtains 20.2 ml/kg/min (=(43.9−3.5)×50%) using "(VO$_2$max−VO$_2$rest)×50%" to be oxygen consumption during the intermediate intensive exercise performed for 30 minutes based on physical activity amount recommendation guidelines of the ACSM.

Since the user is 70 kg in weight, oxygen consumption of 70 kg is 1,414 milliliters per minute (ml/min) (=20.2 ml/kg/min×70 kg). In this example, the oxygen consumption is converted into a unit of energy expenditure and thus, 7.07 kcal/min is obtained by "1,414 ml/min/1000×5". Thus, when the 25-year-old male who is 70 kg in weight performs the intermediate intensive exercise for 30 minutes, the energy expenditure is 212.1 kcal (=7.07 kcal/min×30 min)

The generation apparatus sets the total activity amount for the user by $(1.0+\beta)\times$(RMR+energy expenditure) where the energy expenditure is, for example, 212.1 kcal. In this example, when the health care goal is the weight loss, $\beta$ is greater than "0". When the health care goal is the weight gain, $\beta$ is greater than "−1" and less than "0". As the foregoing, the generation apparatus obtains the total activity amount of the user by calculating the recommended physical activity amount based on the user information.

In operation 630, the generation apparatus generates the personalized MET information based on the user information.

In operation 640, the generation apparatus calculates a target exercise amount based on a cumulative activity amount in a daily life of the user and the total activity amount set for the user in operation 620.

In operation 650, the generation apparatus generates the personalized exercise program based on the personalized MET information and the target exercise amount.

Figure 7:
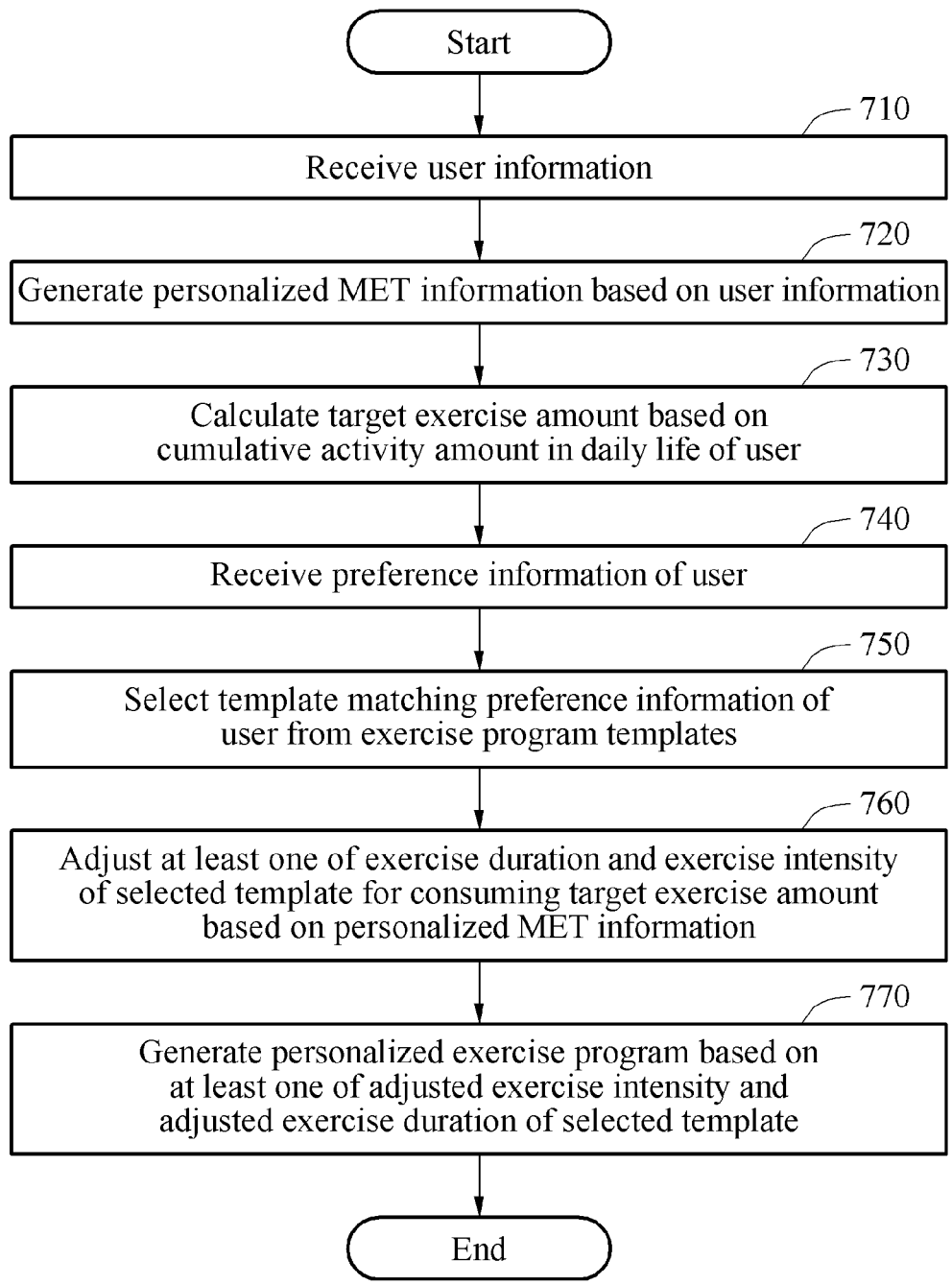

FIG. 7 is a flowchart illustrating another example of a method of generating a personalized exercise program. Referring to FIG. 7, in operation 710, a generation apparatus receives user information. In operation 720, the generation apparatus generates personalized MET information based on the user information.

In operation 730, the generation apparatus calculates a target exercise amount based on a cumulative activity amount in a daily life of a user.

In operation 740, the generation apparatus receives preference information of the user.

In operation 750, the generation apparatus selects a template matching the preference information of the user from exercise program templates.

In operation 760, the generation apparatus adjusts one or both of an exercise duration and an exercise intensity of the selected template for consuming the target exercise amount based on the personalized MET information.

In operation 770, the generation apparatus generates a personalized exercise program based on one or both of the adjusted exercise intensity and the adjusted exercise duration of the selected template. The personalized exercise program includes a plurality of exercise programs having, for example, different types of exercises, exercise durations, and exercise intensities.

In an example, the generation apparatus generates the personalized exercise program based on the target exercise amount and a personalized MET in association with various physical activities.

For example, a 20-year-old male who is 175 cm in height and 75 kg in weight has a target exercise of 200 kcal. The generation apparatus provides, to the user, exercise programs of various physical activities such as walking, running, cycling, football, and basketball. For example, basketball is selected as the preference information of the user from the exercise programs based on a preference of the user and an environment. The generation apparatus selects a template matching the preference information, basketball. Based on the personalized MET information, the generation apparatus adjusts an exercise duration of the basketball to 19 minutes to consume the target exercise amount, 200 kcal as shown in Table 11. The generation apparatus generates an exercise program of playing basketball for 19 minutes and provides the exercise program to the user. The exercise program may be provided to the user as any one or any combination of an image, video and audio provided through a device including or connected to the generation apparatus.

TABLE 11

| Physical activity | MET absolute value | Personalized MET | (Recommended) exercise duration | (Estimated) energy expenditure |
|---|---|---|---|---|
| 4.8 km/h Walking | 3.0 | 3.12 | 51 min. | 198.90 kcal |
| 6.4 km/h Walking | 5.0 | 5.19 | 31 min. | 201.11 kcal |
| 8.0 km/h Running | 8.0 | 8.31 | 19 min. | 197.36 kcal |
| 16 km/h Cycling | 6.0 | 6.23 | 26 min. | 202.48 kcal |
| Basketball, Tennis singles | 8.0 | 8.31 | 19 min. | 197.36 kcal |
| Soccer | 7.0 | 7.27 | 22 min. | 199.93 kcal |

In an example, the generation apparatus selects an exercise program from a plurality of exercise programs based on one or both of the preference information and the user information, and provides the selected exercise program to the user.

Figure 8:
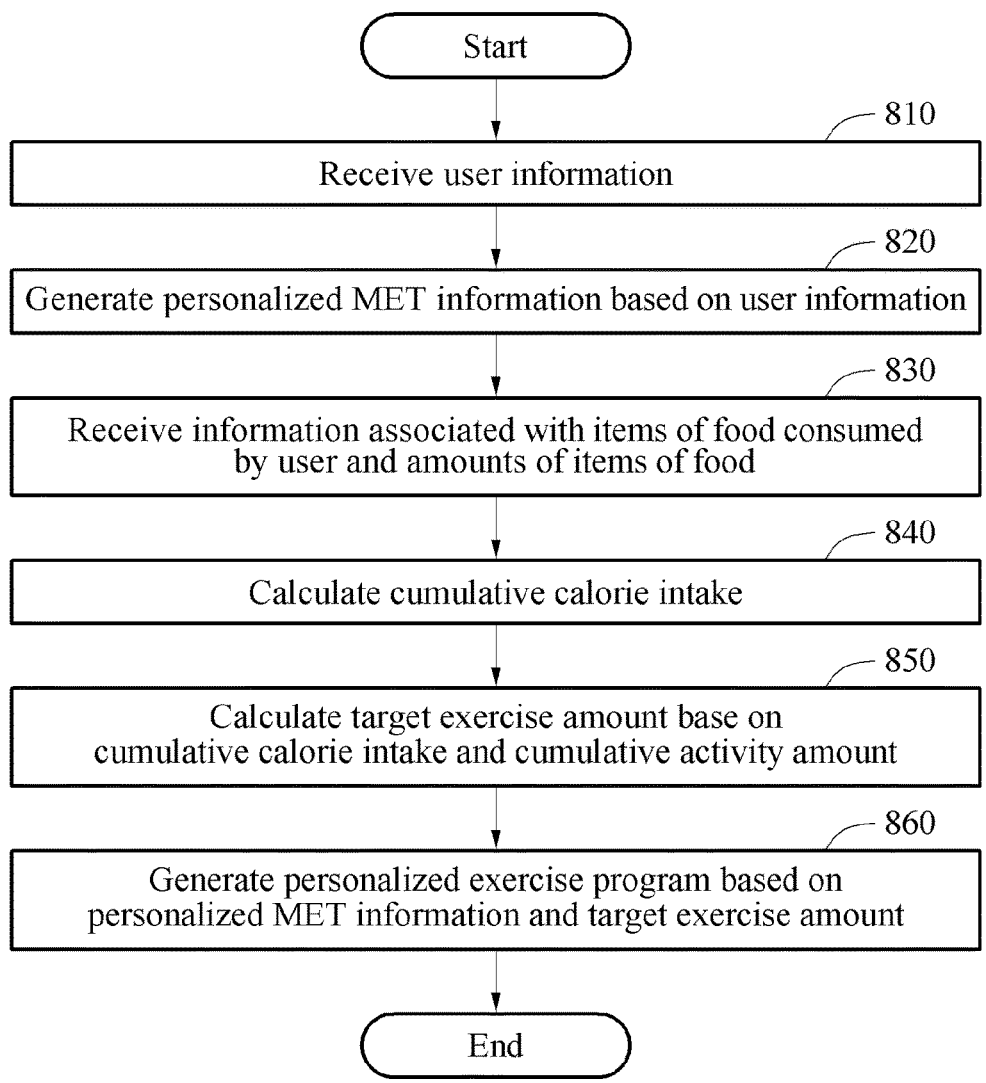

FIG. 8 is a flowchart illustrating another example of a method of generating a personalized exercise program. Referring to FIG. 8, in operation 810, a generation apparatus receives user information. In operation 820, the generation apparatus generates personalized MET information based on the user information.

In operation 830, the generation apparatus receives information associated with items of food consumed by the user and amounts of the items of food. The information associated with the items of food consumed by the user includes, for example, types of the items of food and nutritional data associated with the items of food based on the types of the of the items of food. The generation apparatus receives the information associated with the items of food consumed by the user for a predetermined period of time, for example, a day or a week and an amount of the foods. In this example, the generation apparatus receives the information through an input of the user or receives the information from an external device.

In operation 840, the generation apparatus calculates a cumulative calorie intake of the user based on the information received in operation 830. In an example, the generation apparatus calculates or estimates the cumulative calorie intake based on a blood cholesterol level, a blood triglyceride level, or a blood sugar level as well as the items of food and the amounts of the items of food.

In operation 850, the generation apparatus calculates a target exercise amount based on the cumulative calorie intake and a cumulative activity amount.

In operation 860, the generation apparatus generates a personalized exercise program based on the personalized MET information generated in operation 820 and the target exercise amount calculated in operation 850.

Hereinafter, an example of a method of generating the personalized exercise program based on basic MET information and the target exercise amount or a remaining exercise amount will be described with reference to FIGS. 9 and 10.

Figure 9:
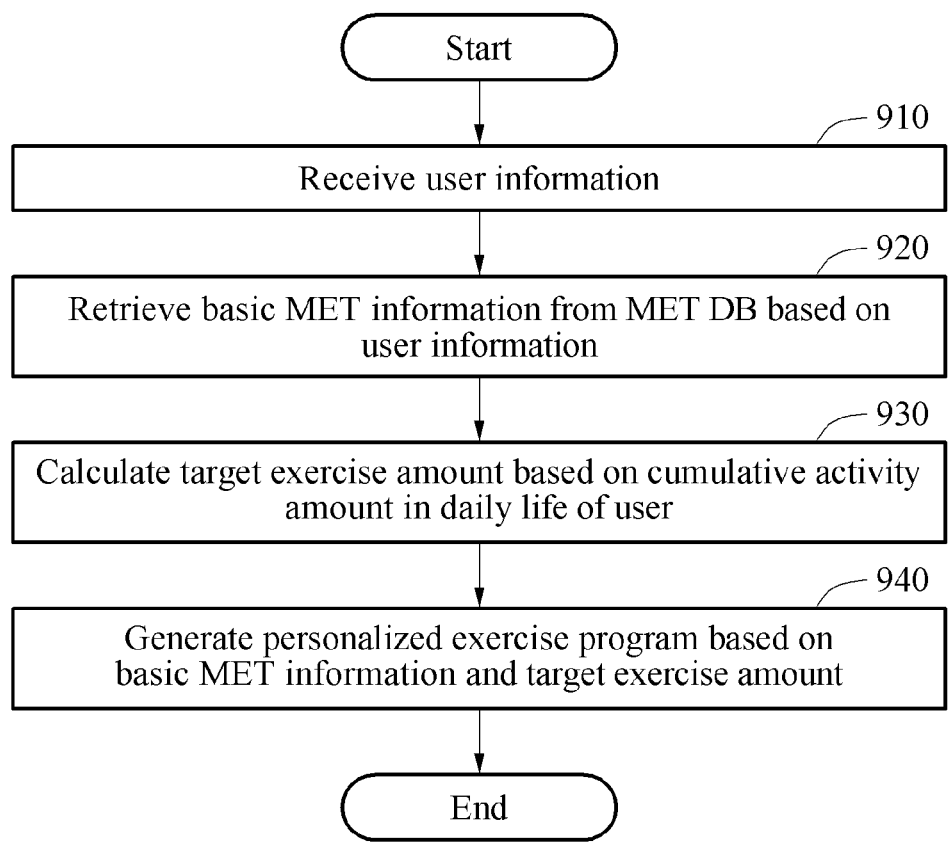

FIG. 9 is a flowchart illustrating another example of a method of generating a personalized exercise program. Referring to FIG. 9, in operation 910, a generation apparatus receives user information. In operation 920, the generation apparatus retrieves basic MET information from a MET DB based on the user information. For example, the generation apparatus retrieves the basic MET information as shown in Table 1 above.

In operation 930, the generation apparatus calculates a target exercise amount based on a cumulative activity amount in a daily life of a user.

In operation 940, the generation apparatus generates a personalized exercise program based on the basic MET information obtained in operation 920 and the target exercise amount calculated in operation 930. The generation apparatus determines exercise information including, for example, an exercise duration, an exercise intensity, and a type of exercise for consuming the target exercise amount based on the basic MET information, and generates the personalized exercise program based on the exercise information. Also, the generation apparatus generates the personalized exercise program using preset exercise program templates and the target exercise amount based on the basic MET information.

Figure 10:
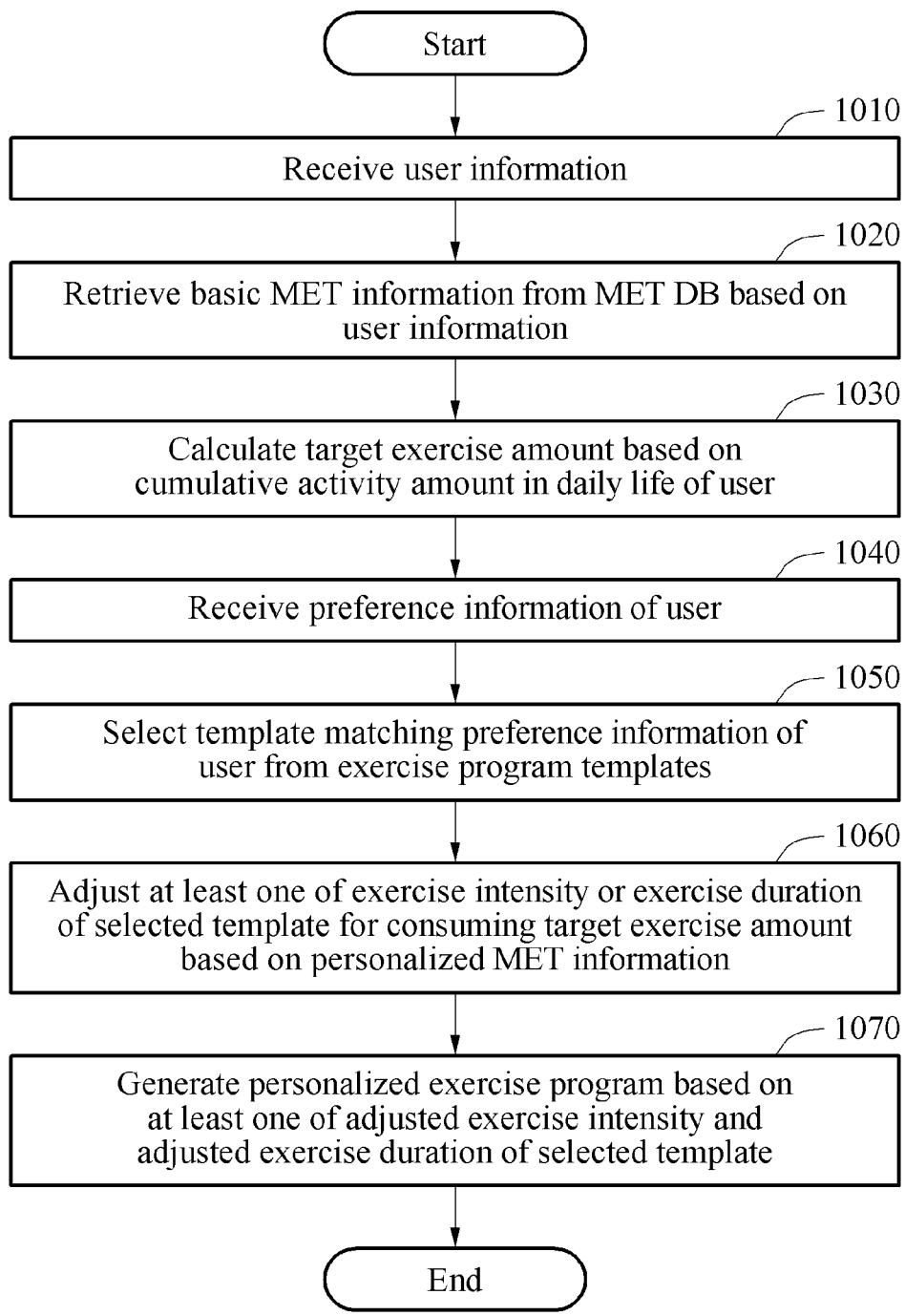

FIG. 10 is a flowchart illustrating yet another example of a method of generating a personalized exercise program. Referring to FIG. 10, in operation 1010, a generation apparatus receives user information. In operation 1020, the generation apparatus retrieves basic MET information from a MET DB based on the user information.

In operation 1030, the generation apparatus calculates a target exercise amount based on a cumulative activity amount in a daily life of a user.

In operation 1040, the generation apparatus receives preference information of the user.

In operation 1050, the generation apparatus selects a template matching the preference information of the user from exercise program templates.

In operation 1060, the generation apparatus adjusts one or both of an exercise intensity and an exercise duration of the selected template for consuming the target exercise amount based on personalized MET information.

In operation 1070, the generation apparatus generates a personalized exercise program based on one or both of the adjusted exercise intensity and the adjusted exercise duration of the selected template.

The communication interface 102, the processor 104, the memory 106 and the sensor 108 in FIG. 1A that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1B to 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to generate a personalized exercise program, the method comprising:
receiving, at a processor, user information of a user;
generating, using the processor, personalized metabolic equivalent of task (MET) information based on the user information;
calculating, using the processor, a target exercise amount based on a cumulative activity amount in a daily life of the user including resting state of the user and an activity of the user, based on data sensed by one or more sensors and stored in memory; and
generating, using the processor, a personalized exercise program based on the personalized MET information and the target exercise amount,
wherein the generating of the personalized MET information comprises:
retrieving, from a MET database (DB), basic MET information indicating a ratio between an amount of energy used during the activity of the user and an amount of energy used in the resting state of the user, and
generating the personalized MET information by processing the basic MET information based on a Resting Metabolic Rate (RAR) according to the user information.

2. The method of claim 1, wherein the calculating of the target exercise amount comprises:
estimating the cumulative activity amount in the daily life of the user; and
calculating the target exercise amount based on a total activity amount for the user and the cumulative activity amount, wherein the total activity amount is a goal amount of activity.

3. The method of claim 2, wherein the total activity amount is set based on a health care goal and a health care period of the user.

4. The method of claim 1, wherein the generating of the personalized exercise program comprises generating, based on the target exercise amount, the personalized exercise program using preset exercise program templates and the personalized MET information.

5. The method of claim 4, wherein the generating of the personalized exercise program comprises:
adjusting one or both of an exercise intensity and an exercise duration of the exercise program templates to consume the target exercise amount based on the personalized MET information; and
generating the personalized exercise program based on one or both of the adjusted exercise intensity and the adjusted exercise duration of the exercise program templates.

6. The method of claim 4, further comprising:
receiving, using the processor, preference information of the user,
wherein the generating of the personalized exercise program further comprises
selecting a template matching the preference information from the exercise program templates,
adjusting one or both of an exercise intensity and an exercise duration of the selected template for consuming the target exercise amount based on the personalized MET information, and
generating the personalized exercise program based on one or both of the adjusted exercise intensity or the adjusted exercise duration of the selected template.

7. The method of claim 1, further comprising:
calculating, using the processor, a cumulative calorie intake of the user,
wherein the calculating of the target exercise amount comprises calculating the target exercise amount based on the cumulative calorie amount and the cumulative activity amount.

8. The method of claim 1, wherein the user information comprises any one or any combination of a gender, an age, a height, a weight, a waist size, a body mass index (BMI), a physical activity level, a body condition, a physical fitness level, a health care goal, and a health care period of the user.

9. The method of claim 1, wherein the personalized exercise program comprises exercise programs having any one or any combination of different types of exercises, different exercise durations, and different exercise intensities.

10. The method of claim 9, further comprising:
receiving, using the processor, preference information of the user,
wherein the generating of the personalized exercise program comprises
selecting an exercise program from among the exercise programs based on one or both of the preference information and the user information, and
providing, using the processor, the selected exercise program to the user.

11. A non-transitory computer-readable medium storing instructions that, when executed by the processor, cause the processor to perform the method of claim 1.

12. A method to generate a personalized exercise program, the method comprising:
receiving, at a processor, user information of a user;
retrieving, using the processor, basic metabolic equivalent of task (MET) information from a MET database (DB) based on the user information;
calculating, using the processor, a target exercise amount based on a cumulative activity amount in a daily life of a user including resting state of the user and an activity of the user, based on data sensed by one or more sensors and stored in memory; and
generating, using the processor, a personalized exercise program based on the basic MET information and the target exercise amount,
wherein the generating of the personalized MET information comprises:
retrieving, from a MET database (DB), the basic MET information indicating a ratio between an amount of energy used during the activity of the user and an amount of energy used in the resting state of the user, and
generating the personalized MET information by processing the basic MET information based on a Resting Metabolic Rate (RAR) according to the user information.

13. The method of claim 12, wherein the generating of the personalized exercise program comprises:
determining, based on the basic MET information, exercise information including a type of exercise, an exercise intensity, and an exercise duration to consume the target exercise amount; and
generating the personalized exercise program based on the exercise information.

14. The method of claim 12, wherein the generating of the personalized exercise program comprises generating the personalized exercise program using preset exercise program templates.

15. The method of claim 13, further comprising:
receiving, using the processor, preference information of the user,
wherein the generating of the personalized exercise program comprises
selecting a template matching the preference information from the exercise program templates,
adjusting one or both of an exercise intensity and an exercise duration of the selected template to consume the target exercise amount based on the personalized MET information, and
generating the personalized exercise program based on one or both of the adjusted exercise intensity and the adjusted exercise duration of the selected template.

16. An apparatus to generate a personalized exercise program, the apparatus comprising:
a processor configured to
receive user information of a user,
generate personalized metabolic equivalent of task (MET) information based on the user information, and
generate a personalized exercise program using the personalized MET information and a target exercise amount calculated based on a cumulative activity amount in a daily life of a user, including resting state of the user and an activity of the user, based on data sensed by one or more sensors and stored in memory,
wherein the generating of the personalized MET information comprises:
retrieving, from a MET database (DB), basic MET information indicating a ratio between an amount of energy used during the activity of the user and an amount of energy used in the resting state of the user, and
generating the personalized MET information by processing the basic MET information based on a Resting Metabolic Rate (RAR) according to the user information.

17. The apparatus of claim 16, wherein the processor is further configured to:
estimate the cumulative activity amount in the daily life of the user; and
calculate the target exercise amount based on the cumulative activity amount and a total activity amount for the user, the total activity mount being a goal amount of activity.

18. The apparatus of claim 16, further comprising:
a memory configured to store a basic MET database (DB) including MET information,
wherein the processor is further configured to retrieve the basic MET information from the MET DB and generate the personalized MET information by processing the basic MET information based on the user information.

19. The apparatus of claim 18, wherein:
the memory comprises a template DB configured to store preset exercise program templates; and
the processor is further configured to generate, based on the target exercise amount, the personalized exercise program using the preset exercise program templates and the personalized MET information.

* * * * *